United States Patent
Pean et al.

(10) Patent No.: US 10,776,294 B2
(45) Date of Patent: Sep. 15, 2020

(54) SYSTEM ARCHITECTURE WITH SECURE DATA EXCHANGE

(71) Applicant: Atmel Corporation, San Jose, CA (US)

(72) Inventors: Guillaume Pean, Aix en Provence (FR); Vincent Debout, La Ciotat (FR); Marc Maunier, Marseilles (FR)

(73) Assignee: Atmel Corporation, San Jose, CA (US)

( * ) Notice: Subject to any disclaimer, the term of this patent is extended or adjusted under 35 U.S.C. 154(b) by 64 days.

(21) Appl. No.: 14/942,713

(22) Filed: Nov. 16, 2015

(65) Prior Publication Data

US 2017/0139851 A1    May 18, 2017

(51) Int. Cl.
*G06F 13/20* (2006.01)
*G06F 13/10* (2006.01)
*G06F 13/40* (2006.01)

(52) U.S. Cl.
CPC ............ *G06F 13/20* (2013.01); *G06F 13/102* (2013.01); *G06F 13/4068* (2013.01)

(58) Field of Classification Search
CPC ..... G06F 13/20; G06F 13/102; G06F 13/4068
See application file for complete search history.

(56) References Cited

U.S. PATENT DOCUMENTS

| | | | | |
|---|---|---|---|---|
| 5,199,106 A | * | 3/1993 | Bourke ................. | G06F 13/405 710/110 |
| 6,182,261 B1 | * | 1/2001 | Haller .................. | H03M 13/29 714/758 |
| 2006/0253763 A1 | * | 11/2006 | Oliva .................... | H04L 1/0001 714/746 |
| 2007/0124653 A1 | * | 5/2007 | Conti .................. | G06F 11/1044 714/781 |
| 2007/0198851 A1 | * | 8/2007 | Goto ....................... | G06F 21/54 713/187 |
| 2007/0209072 A1 | * | 9/2007 | Chen ........................ | G06F 21/10 726/16 |
| 2010/0100747 A1 | * | 4/2010 | Boscher .................. | G09C 1/00 713/187 |
| 2016/0098580 A1 | * | 4/2016 | Kaluzhny ................ | G09C 1/00 713/189 |
| 2017/0012849 A1 | * | 1/2017 | Verma ................. | H04L 12/4633 |

* cited by examiner

*Primary Examiner* — Tim T Vo
*Assistant Examiner* — Harry Z Wang
(74) *Attorney, Agent, or Firm* — TraskBritt (57) ABSTRACT

In an embodiment, a system comprises: a first bus; a second bus; a first peripheral coupled to the first bus and the second bus, the first peripheral configured to receive a command from the first bus and to generate data in response to the first command; and a second peripheral coupled to the first bus and the second bus, the second peripheral configured to initiate transfer of the generated data from the first peripheral to the second peripheral over the second bus such that access to the generated data through the first bus is prevented.

16 Claims, 6 Drawing Sheets

SYSTEM ARCHITECTURE WITH SECURE DATA EXCHANGE

TECHNICAL FIELD

This disclosure relates to system architectures.

BACKGROUND

A system on chip (SoC) used in secure applications may be configured to exchange sensitive data within the SoC in a secure manner. For example, an application using a cryptographic algorithm may exchange cryptographic keys between peripherals in the SoC. If the cypher key transfer occurs on a software accessible system bus the data becomes vulnerable to third party attacks which may result in exposure of the cypher keys.

SUMMARY

In an embodiment, a system comprises: a first bus; a second bus; a first peripheral coupled to the first bus and the second bus, the first peripheral configured to receive a command from the first bus and to generate data in response to the first command; and a second peripheral coupled to the first bus and the second bus, the second peripheral configured to initiate transfer of the generated data from the first peripheral to the second peripheral over the second bus such that access to the generated data through the first bus is prevented.

In an embodiment, a method comprises: sending, by a master or peripheral in a system having a first bus and a second bus, a first command to a first peripheral coupled to the first bus and the second bus, the second bus configured to prevent access through the first bus to data transferred on the second bus; receiving, by the first peripheral, the first command from the first bus; generating, by the first peripheral, data in response to the first command; and initiating, by a second peripheral coupled to the second bus, a transfer of the data on the second bus from the first peripheral to the second peripheral.

In an embodiment, a device comprises: an interface configured to couple to a first bus; a second bus; and a first peripheral coupled to the interface and the second bus, the first peripheral configured to receive a command over the interface, to generate data in response to the command and to transfer the data to a second peripheral over the second bus such that access to the generated data through the first bus is prevented.

DETAILED DESCRIPTION

In an embodiment, a cryptographic algorithm is implemented, such as, for example, Advanced Encryption Standard (AES). In one embodiment, however, the disclosed system architecture and protocol is applicable to any application that would benefit from on-chip secure data transfer. Moreover, one embodiment includes a secure bus for sensitive data transfer using a secure data transfer protocol to avoid attack during data transfer. The secure bus cannot be accessed by software configured to communicate over or have access to the system bus. Peripherals that need to transfer sensitive data with each other are coupled to the secure bus and exchange the sensitive data on the secure bus (rather than the system bus) using the secure data transfer protocol. In an embodiment, the data transfer includes integrity packets for checking for data corruption during the data transfer on the secure bus. The integrity packets can be transferred with the data using a number of formats, including, but not limited to: interleaved integrity packets, non-interleaved integrity packets and randomly interleaved integrity packets.

As used herein, the terms "block," "module" or "processing block" refer to one or more circuits that work together to perform one or more operations. A "block," "module" or "processing block" may also execute software or firmware to perform the set of operations depending on the application.

Example System

Figure 1:
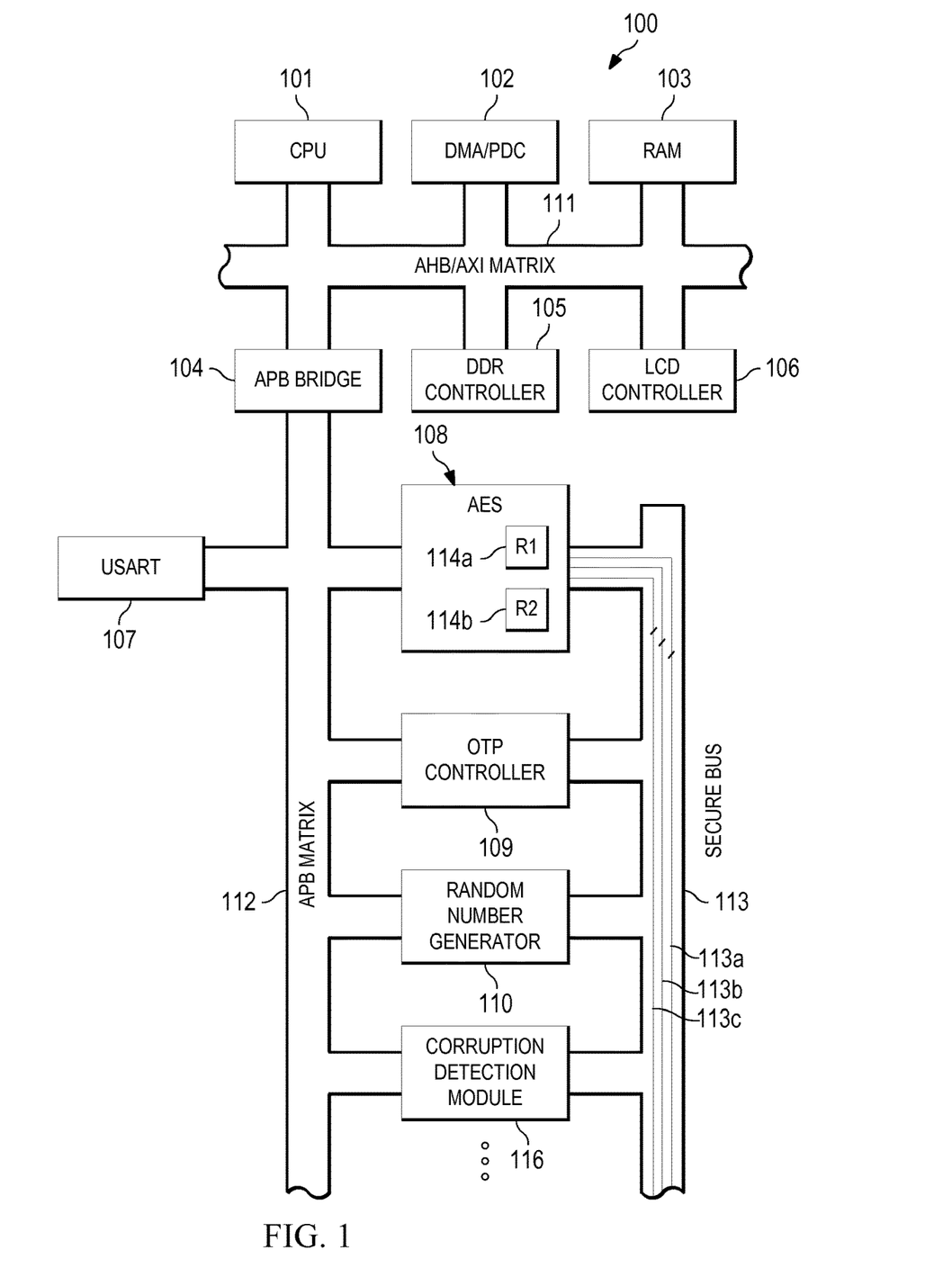
FIG. 1 is a conceptual block diagram of an example system with secure data exchange, in accordance with an embodiment.

FIG. 1 is a conceptual block diagram of an example microcontroller system 100, in accordance with an embodiment. Microcontroller system 100 can be included in an integrated circuit chip, such as a microcontroller unit or SoC. Microcontroller system 100 includes central processing unit 101 (CPU), direct memory access (DMA)/peripheral data controller (PDC) 102, memory 103, peripheral bus bridge 104, double data rate (DDR) controller 105 and display controller 106, each of which is coupled to system bus 111. System bus 111 can be, for example, an advanced microcontroller bus architecture (AMBA) high-performance bus (AHB) or bus matrix (AXI). Additionally, peripheral bus bridge 104 couples system bus 111 to peripheral bus 112. Peripheral bus 112 can be, for example, an AMBA peripheral bus (APB) bus matrix. System bus 111 and peripheral bus 112 are also referred to individually or collectively as a "system bus."

Several peripherals or processing blocks are coupled to peripheral bus 112, including USART block 107, AES block 108, one-time programmable (OTP) controller 109 and random number generator (RNG) block 110. In practice, microcontroller system 100 can include more or fewer components or subsystems than is shown in FIG. 1.

Referring to the system bus components, if DMA/PDC controller 102 is a DMA controller, DMA controller 102 transfers data between memories and peripherals with minimal intervention by CPU 101. While CPU 101 spends time in sleep modes or performs other tasks, DMA/PDC controller 102 offloads CPU 101 bus transfer tasks by copying data from one area to another. A complete DMA read and write operation between memories and/or peripherals is called a DMA transaction. A transaction is performed by DMA/PDC controller 102 in data blocks and the size of the transaction (number of bytes to transfer) is selectable from software and controlled by the block size and repeat counter settings.

If DMA/PDC controller 102 is a PDC controller, PDC controller 102 transfers data between on-chip serial peripherals and on and/or off-chip memories. Using the PDC removes processor overhead by reducing its intervention during the transfer. This significantly reduces the number of clock cycles for a data transfer, which improves microcontroller system performance. To launch a transfer, the peripheral triggers its associated PDC channels by using handshake signals. When the programmed data is transferred, an end of transfer interrupt indicating the end of the data transfer is generated by the peripheral itself.

In an embodiment, DDR controller 105 is used to drive DDR memory (e.g., synchronous dynamic random access memory (SDRAM)), where data is transferred on both rising and falling edges of the system's memory clock signal. Display controller 106 can be, for example a liquid crystal display (LCD) controller for activating a segment of an LCD display.

Referring to the peripherals on peripheral bus 112, AES block 108 performs AES encryption/decryption processes, OTP matrix controller 109 permanently stores a cypher key. RNG block 110 generates a random number used to generate the cypher key. AES is a symmetric block cipher. Each cipher encrypts and decrypts data in blocks (e.g., 128 bits) using cryptographic keys (e.g., 128, 192 or 256 bits), respectively. Symmetric or secret-key ciphers use the same key for encrypting and decrypting, so both the sender and the receiver know and use the same secret key. Depending on key length, there are several processing steps that include substitution, transposition and mixing of an input plaintext and transform it into a final output of cipher text.

In an example embodiment, a cryptographic application running on microcontroller system 100 uses RNG block 110 to generate a random number that can be used to generate a cypher key for an AES algorithm implemented by AES block 108. Secure bus 113 is coupled to RNG block 110, OTP controller 109 and AES block 108. Secure bus 113 is configured to prevent access to data transferred on secure bus 113. For example, malicious commands executed by application software that are transferred over system bus 111 cannot access data transferred on secure bus 113. Secure bus 113 can therefore be used to defend against, for example, a buffer overflow attack.

Although in this example all three blocks share peripheral bus 112, the disclosed embodiments are not limited to blocks coupled to the same bus. In an embodiment, secure bus 113 includes a data bus 113a, a command bus 113b and an error checking bus 113c. The secure bus 113 can be bidirectional. In an embodiment, data bus 113a includes a write data bus and a read data bus. In an embodiment, secure bus 113 can manage synchronous transmissions or asynchronous transmissions depending on the application. Synchronous transmissions are synchronized by an external clock while asynchronous transmissions are synchronized by signals along secure bus 113. Asynchronous transmissions use less hardware and are suited for applications where data is transferred at irregular intervals. Synchronous transmission has lower overhead and greater data throughput.

When application software initializes microcontroller system 100, the application software is configured, when executed by CPU 101, to cause CPU 101 to send a first command on peripheral bus 112 to RNG block 110 to generate a random number for a cypher key. RNG block 110 implements a true random number generator in software and/or hardware. The application software, when executed by CPU 101, causes CPU 101 to send a second command on peripheral bus 112 to AES block 108 to initiate transfer of the random number from RNG block 110 to AES block 108 using secure bus 113. AES block 108 generates the key using the random number and then stores the key in first AES key register 114a (R1). The transfer is a peripheral-to-peripheral (P2P) transfer from RNG block 110 to AES block 108 over secure bus 113 without any temporary storage of the cypher key in, for example, system memory. Thus, the transfer of the cypher key occurs outside the application's control on secure bus 113.

In an embodiment, OTP controller 109 may store the cypher keys permanently in a secure register or secure memory, such as OTP memory (e.g., EPROM). After the cypher key has been stored in the first AES key register 114a, a third command can be sent to OTP controller 109 on peripheral bus 112 to transfer the cypher key from the secured memory or register to a second AES key register 114b (R2) using secure bus 113.

In general, any number of peripherals can be coupled to secure bus 113 and each peripheral coupled to secure bus 113 can transfer to and receive data from one or more other peripherals coupled to secure bus 113. In an embodiment, two or more peripherals can be coupled to secure bus 113 but not to system bus 111 or peripheral bus 112.

Figure 2A:
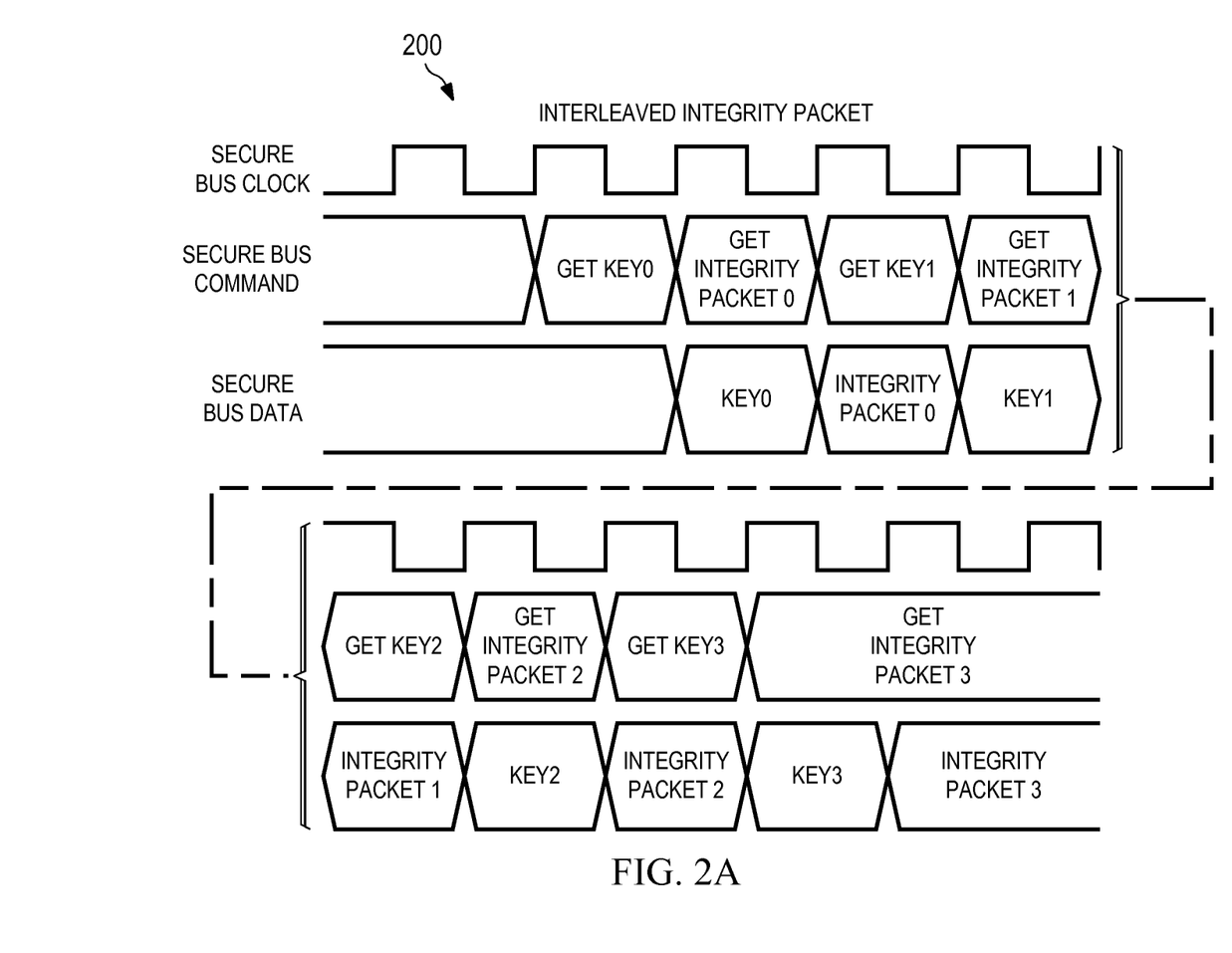
FIGS. 2A-2C show three sets of example waveforms illustrating three example secure data transfer protocols on a secure bus, in accordance with various embodiments.
Figure 2B:
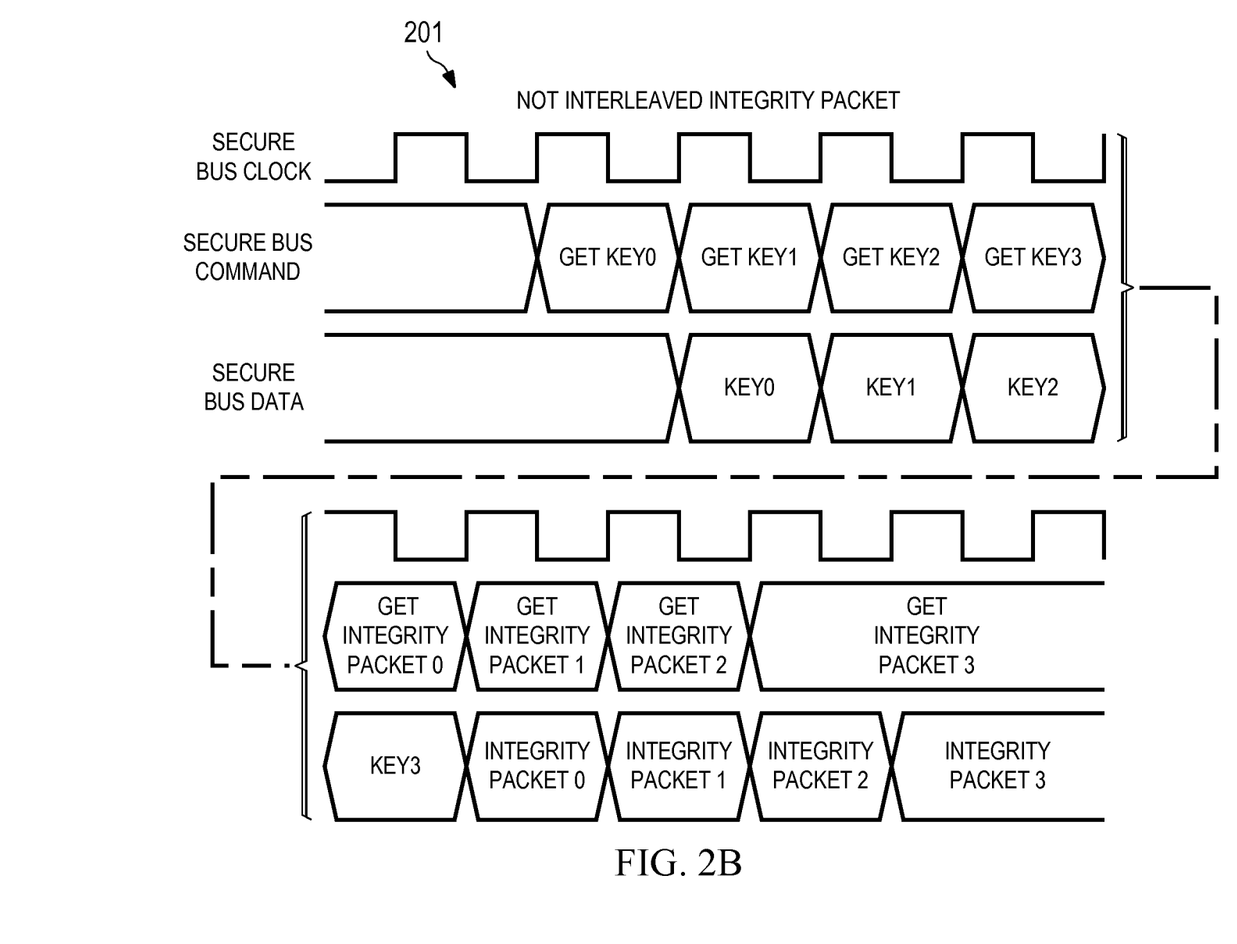
Figure 2C:
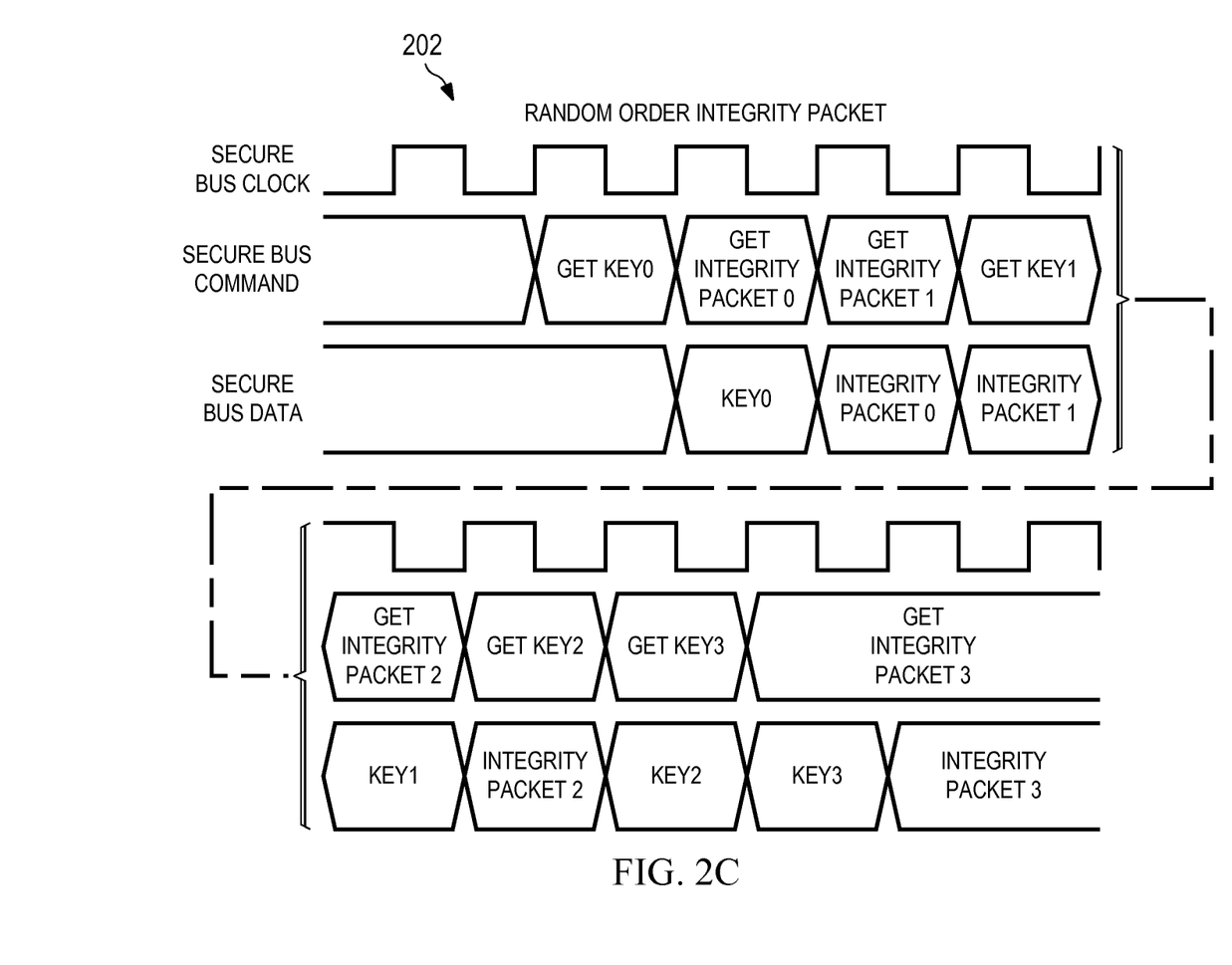

FIGS. 2A-2C are three sets of waveforms illustrating a secure data transfer protocol on secure bus 113, in accordance with an embodiment. During the cypher key transfer on secure bus 113 a third party could force secure bus 113 to a value (e.g., all "1s" or "0s") and thus break the application security that enforces the cipher key. To address this issue, an embodiment uses integrity data to prevent such attack. For example, for every packet of data transferred (e.g., a byte of data) on secure bus 113 a corresponding integrity data packet can be generated. Corruption detection block 116 coupled to secure bus 113 receives the cypher key data from secure bus 113 and detects if the data packet has been corrupted while being transferred on secure bus 113 using the integrity data packet. In an embodiment, the integrity data packet includes a cyclic redundancy check (CRC) code (e.g., a byte), but an integrity data packet can be generated using other codes and methods.

In an embodiment, corruption detection block 116 can be coupled to the system bus (e.g., peripheral bus 112) so that when corruption detection block 116 detects data corruption in the cypher key data on secure bus 113 it can inform the application of the corruption so that the application can initiate security measures. In an embodiment, corruption detection block 116 can be included in a peripheral (e.g., included in AES block 108).

Referring to FIG. 2A, a first set of waveforms 200 illustrate how key bytes are interleaved with their corresponding integrity packet. In FIG. 2A, Key n is the "n"-th byte of a 128-bit AES key and Integrity Packet "n" is its corresponding integrity check byte. Referring to FIG. 2B, a second set of waveforms 201 illustrate how the integrity packets are transferred after their corresponding key bytes are transferred. Referring to FIG. 2C, a third set of waveforms 202 illustrate how the integrity packets are randomly interleaved between their corresponding key bytes. In an embodiment, the data sequence order is randomly selected by a master (e.g., CPU 101) each time a new key transfer is requested. The random interleaving of integrity packets with cypher key data prevents attacks on secure bus 113 during data transfer.

Generally, integrity packets can be transferred with their corresponding cypher key data in multiple ways, including but not limited to: interleaving integrity data with cypher key data, interleaving integrity data randomly with cypher key data, transferring integrity data before all corresponding cypher key data is transferred and transferring integrity data after all corresponding cypher key data is transferred. Integrity data can be CRC codes or any other error detection and/or correction code. In an embodiment, in addition to or in lieu of using integrity data, addresses and/or data can be scrambled dynamically before being transferred on secure bus 113.

Example Process

Figure 3:
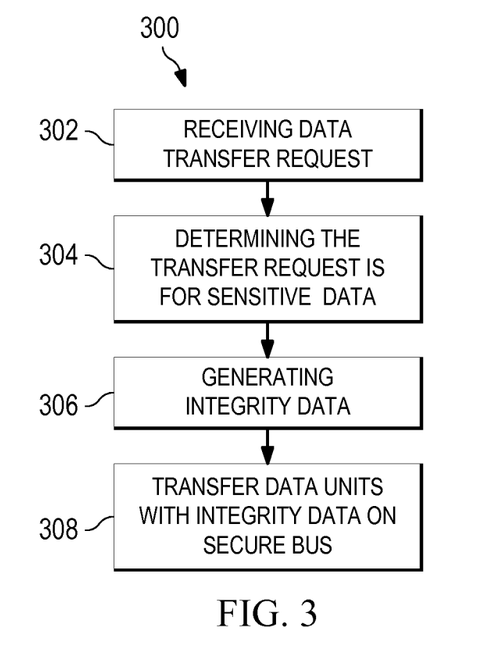
FIG. 3 is a flow diagram of an example process for secure data exchange on a secure data bus, in accordance with an embodiment.

FIG. 3 is a flow diagram of an example process for secure data exchange on a secure data bus, in accordance with an embodiment. Process 300 can be implemented by, for example, microcontroller system 100 described in reference to FIG. 1.

In some implementations, process 300 can begin by receiving, by a peripheral, a data transfer request on a system bus (302). A system bus can include one or more buses including a peripheral bus, such as peripheral bus 112 shown in FIG. 1. The request can be sent by, for example, a master (e.g., a CPU) or another peripheral. The request can cause the peripheral to generate data to be shared with, for example, another peripheral.

Process 300 can continue by determining that the transfer request is for sensitive data in response to the request (304). Using the previous example, if sensitive data is to be transferred, RNG block 110 can generate a random number for generating a cypher key.

Process 300 can continue by generating integrity data (306). The integrity data (e.g., a CRC code) can be interleaved with key data, appended to the beginning or the end of the key data or randomly interleaved with key data. In an embodiment, addresses or data can be scrambled before being transferred on secure bus 113. For example, a master or peripheral can issue a secure bus command to initiate a data transfer over secure bus 113. Using the previous example, a command is sent to OTP controller 109 to request a data transfer of the random number from secure memory or a secure register to AES block 108 over secure bus 113.

Process 300 can continue by transferring data packets with corresponding integrity data on secure bus 113 in response to a secure bus command generated by peripheral (308). For example, the data can be transferred in data packets on secure bus 113 along with corresponding integrity data packets to ensure the integrity of the data transferred.

Referring to FIG. 2A, a secure bus clock can be used for synchronous transmission of data packets and integrity data packets on secure bus 113. A first peripheral can issue a first secure bus command to a second peripheral to transfer a data packet (e.g., cypher key data). The first secure bus command is followed by a second secure bus command to transfer an integrity data packet corresponding to the data packet. At the second peripheral the first and second secure bus commands are used to initiate transfer of the data packet, followed by the transfer of the corresponding integrity data packet on secure bus 113. The transfer can terminate when the requested data packets and integrity data packets have been transferred to the first peripheral.

Referring to FIG. 2B, a first peripheral can issue a first set of secure bus commands to transfer data packets. After issuing the first set of secure bus commands to transfer data packets, the first peripheral can issue a second set of secure bus commands to transfer integrity data packets corresponding to the data packets. At the second peripheral the first set of secure bus commands are used to initiate transfer of the data packets and the second set of secure bus commands are used to initiate transfer of the integrity data packets on secure bus 113. The transfer can terminate when the requested data packets and integrity data packets have been transferred to the first peripheral.

Referring to FIG. 2C, a first peripheral can issue a first secure bus command to a second peripheral to get a first data packet. The first secure bus command is followed by a second secure bus command to transfer either a second data packet or a first integrity data packet corresponding to the first data packet. Whether or not the second data packet or the first integrity data packet is transferred is randomly determined by, for example, the first peripheral or a master. This random interleaving continues until secure bus commands are sent for all the requested data packets and corresponding integrity data packets. At the second peripheral, transfer is initiated for data packets and integrity data packets in response to the randomly interleaved transfer requests from the first peripheral or master. The data transfer can terminate when the requested data packets and corresponding integrity data packets have been transferred to the first peripheral.

Figure 4:
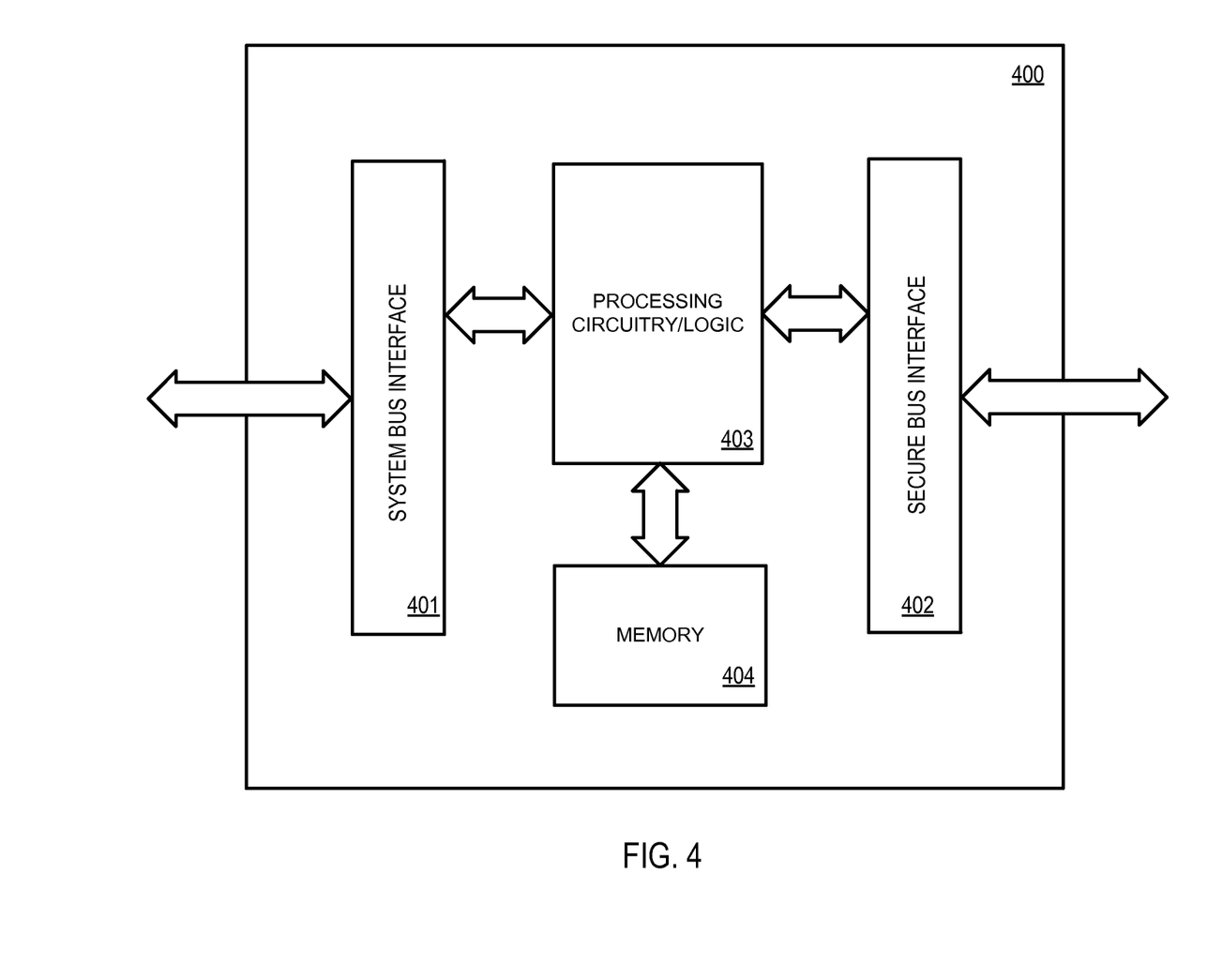
FIG. 4 is a conceptual block diagram of an example peripheral configured to perform secure data exchange.

FIG. 4 is a conceptual block diagram of an example peripheral 400 configured to perform secure data exchange. Some example peripherals are AES block 108, OTP controller 109 and RNG block 110. In an embodiment, peripheral 400 can include system bus interface 401, secure bus interface 402, processing circuitry/logic 403 and memory 404. In an embodiment, system bus interface 401 includes circuitry for interfacing with a system bus (e.g., APB matrix 112), including but not limited to: address decoders, registers, buffers, signal conditioning circuitry and the like. Secure bus interface 402 includes circuitry for interfacing with a system bus (e.g., APB matrix 112), including but not limited to: address decoders, registers, buffers, signal conditioning circuitry and the like. In an embodiment, system bus interface 401 and/or secure bus interface 402 can include a bus controller configured to manage input/output of address, data and control signals to and from the system bus and secure bus. A bus controller in secure bus interface 402 can be configured to generate data packets and integrity data packets and generate the secure bus commands shown in FIGS. 2A-2C. Processing circuitry/logic 403 can include circuitry for performing one or more applications and store data generated or used by those application(s) in memory 404.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A system comprising:
a first bus;
a second bus;
a first peripheral coupled to the first bus and the second bus, the first peripheral configured to receive a first command from the first bus and to generate a random number in response to the first command;
a second peripheral coupled to the first bus and the second bus, the second peripheral configured to initiate a peripheral-to-peripheral transfer of the random number from the first peripheral to the second peripheral over the second bus such that access to the random number through the first bus is prevented, the second peripheral configured to generate a cypher key using the random number; and a corruption detection module directly coupled to the first bus and the second bus and configured to detect data corruption in the cypher key on the second bus and to transmit a signal or message over the first bus to inform an application on the first bus of the data corruption.

2. The system of claim 1, wherein the first peripheral is configured to:
generate integrity data; and
transfer the random number with the integrity data to the second peripheral over the second bus.

3. The system of claim 2, wherein the first peripheral is further configured to:
transfer the random number, interleaved with the integrity data, over the second bus.

4. The system of claim 2, wherein the first peripheral is further configured to:
transfer the random number over the second bus; and
following the transfer of the random number over the second bus, transfer the integrity data over the second bus.

5. The system of claim 2, wherein the first peripheral is further configured to:
transfer the random number, randomly interleaved with the integrity data, over the second bus.

6. The system of claim 2, wherein the integrity data includes a cyclic redundancy check (CRC) code.

7. The system of claim 1, wherein the second bus is a synchronous bus.

8. A method comprising:
sending, by a master or peripheral in a system having a first bus and a second bus, a first command to a first peripheral coupled to the first bus and the second bus, the second bus configured to prevent access through the first bus to data transferred on the second bus;
receiving, by the first peripheral, the first command from the first bus;
generating, by the first peripheral, a random number in response to the first command;
initiating, by a second peripheral coupled to the second bus, a peripheral-to-peripheral transfer of the random number on the second bus from the first peripheral to the second peripheral, the second peripheral configured to generate a cypher key using the random number;

detecting, by a corruption detection module directly coupled to the first bus and the second bus, corruption in the cypher key on the second bus; and
transmitting, by the corruption detection module, a signal or message over the first bus to inform an application on the first bus of the corruption.

9. The method of claim 8, further comprising:
generating, by the first peripheral, integrity data corresponding to the random number; and
transferring, by the first peripheral, the random number with the integrity data to the second peripheral over the second bus.

10. The method of claim 9, further comprising:
transferring, by the first peripheral, the random number, interleaved with the integrity data, over the second bus.

11. The method of claim 9, further comprising:
following the transfer of the random number over the second bus, transferring the integrity data over the second bus.

12. The method of claim 9, further comprising:
transferring the random number, randomly interleaved with the integrity data, over the second bus.

13. The method of claim 9, wherein the integrity data includes a cyclic redundancy check (CRC) code.

14. The method of claim 8, wherein the second bus is a synchronous bus.

15. A device comprising:
an interface configured to couple to a first bus;
a second bus;
a first peripheral coupled to the interface and the second bus, the first peripheral configured to receive a command over the interface, to generate a random number in response to the command and to initiate a peripheral-to-peripheral transfer of the random number to a second peripheral over the second bus such that access to the random number through the first bus is prevented, the second peripheral configured to generate a cypher key using the random number; and
a corruption detection module directly coupled to the first bus and the second bus and configured to detect data corruption in the cypher key on the second bus and to transmit a signal or message over the first bus to inform an application on the first bus of the data corruption.

16. The device of claim 15, wherein the second peripheral is further configured to:
generate integrity data; and
initiate transfer of the random number from the first peripheral to the second peripheral over the second bus with the integrity data.

* * * * *